June 28, 1927.
D. E. LEWELLEN
1,634,033
BELT SPLICER
Filed May 3, 1926
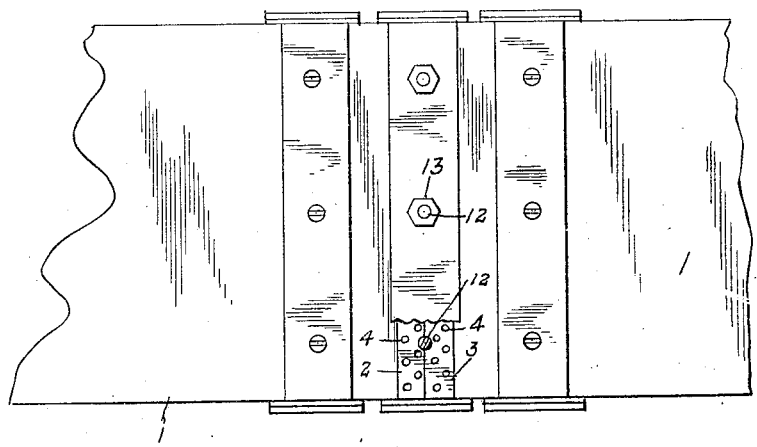
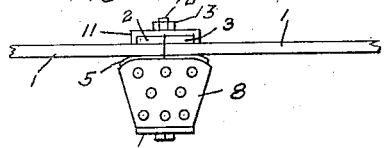
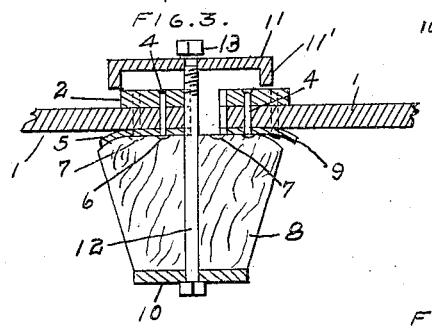
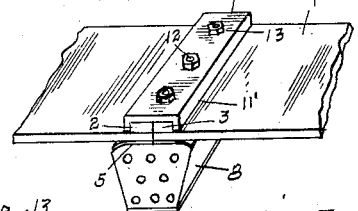
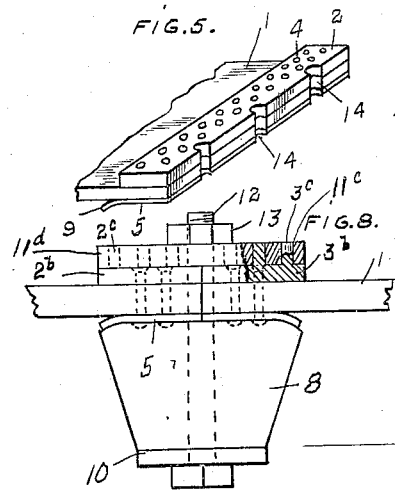
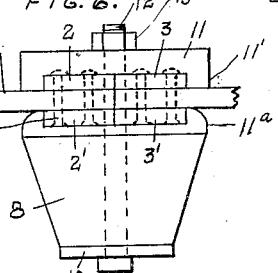
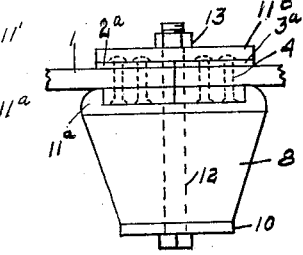
INVENTOR.
DARCY E LEWELLEN
BY Carey S. Frye
ATTORNEY.

Patented June 28, 1927.

1,634,033

UNITED STATES PATENT OFFICE.

DARCY E. LEWELLEN, OF COLUMBUS, INDIANA.

BELT SPLICER.

Application filed May 3, 1926. Serial No. 106,256.

This invention relates to belt splicers or fasteners and is designed primarily for securing the ends of a power belt, such as is employed in connection with variable speed transmission mechanisms, said belt having a series of transverse blocks thereon, with friction pads on the ends thereof.

One feature of the invention is in so constructing the fastening mechanism that it may be readily manipulated for securing the ends of the belt together, even when the transmission mechanism is positioned at a point difficult of access.

A further feature of the invention is the provision of interlocking parts which, when locked together, form an exceptionally strong union and render the belt continuous.

A further feature of the invention is in so constructing the various stationary parts of the splice that they may all be attached in position on the belt while the belt is removed from the transmission mechanism, whereby it is but necessary to clamp the parts together after the belt has been placed in position on the transmission mechanism.

A further feature of the invention is the provision of means for causing the belt to make a uniform bend while passing around the transmission disks.

Other objects and advantages will be hereinafter more fully set forth and pointed out in the accompanying specification.

In the accompanying drawing which is made a part of this application,

Figure 1 is a detail top plan view of the belt with parts broken away.

Figure 2 is an edge elevation thereof.

Figure 3 is a detail sectional view showing the manner of locking the parts of the splicer together.

Figure 4 is a perspective view of a portion of the belt and splicing elements cooperating therewith.

Figure 5 is a detail perspective view of one end of the belt.

Figure 6 is a detail elevation of a slightly modified structure.

Figure 7 is a similar view of a further modified form, and,

Figure 8 is a similar view, partly in section of a still different form of structure.

Heretofore it has been a more or less arduous task to splice the belt around the transmission disks, especially when the transmission mechanism was in use, owing to the limited space to work and the manner in which the splicing was done, but with the present device these objectionable features are entirely overcome.

In the present invention the ends of the belt 1 are provided with cross cleats 2 and 3, which are secured to the belt in any suitable manner, preferably by rivets 4, there being a sufficient number of rivets used to hold the cleats firmly in engagement with the belt ends.

On the opposite side of the belt 1 are placed plates 5, preferably of sheet metal, one below each cleat, through which the rivets 4 also extend, the top ends of the rivets being preferably countersunk in the cleats while the inner ends of the rivets are provided with projecting heads 6, which preferably seat in depressions 7 formed in the upper face of belt blocks 8. The outer edges of the plates are preferably curved to conform to the curvature of the edges of the blocks 8, thus forming a rounding surface 9, over which the belt may bend as it is passing around the transmission disks, thus avoiding abrupt bends which might tend to form a break in the belt.

The blocks 8 are of the usual or any preferred construction and preferably formed of wood, a strap of metal 10 being extended over the under face thereof for reinforcing the same. The ends of the belt are secured together by first drawing the ends of the belt towards each other until the inner faces of the cleats meet, when a channel bar 11 is introduced over the cleats and bolts 12, introduced through the block 8 and the channel bar 11, and secured therethrough by means of nuts 13. The channel bar 11 has depending flanges 11' at each edge thereof which overlaps the side edges of the cleats 2 and 3, thus causing the pull or stress of the belt to be exerted solely against the side edges of the cleats, or at a point to withstand the greatest amount of strain without yielding. The strain is also uniformly distributed throughout the length of the cleats and channel bar. The meeting edges of the belt ends, cleats 2 and 3 and plates 5, are recessed as at 14, to provide circular openings for the passage of the bolts 12, when the ends of the belt are brought together, although it will be understood that one of the cleats may be made wide enough to extend over the opposite end of the belt and the bolt openings formed through this wider section.

In applying this device to use, the cleats 2 and 3 and plates 5 are first secured to the ends of the belt, the belt then extended around the pulleys with which it cooperates and the free ends thereof brought together. The channel bar 11 is then introduced over the cleats and the bolts 12, carried by the block 8, introduced through the recesses 14 and through the channel bar 11. The nuts 13 are then turned onto the bolts 12, thus securely locking the ends of the belt together and the block 8 to the belt.

As shown in Figure 6 of the drawing, the plates 5 may be dispensed with and a second set of cleats 2' and 3' placed on the opposite faces of the belt, in which instance a secondary channel bar 11$^a$ is placed over the block 8 to receive the cleats 2' and 3', while in Figure 7, the cleats 2 and 3 are dispensed with and metal strips 2$^a$ and 3$^a$ substituted therefor, a clamping plate 11$^b$ being also substituted for the channel bar 11. These structures are secured together with bolts 12 as in the former structure.

In Figure 8 of the drawing, is shown a further modified form, in that the cleats 2$^b$ and 3$^b$ are provided with upstanding studs 2$^c$ and 3$^c$ which enter recesses or openings 11$^c$ in the clamping plate 11$^d$. The cleats and clamping plates are shown as attached to the outer face of the belt, but it will be understood that they may be attached to either or both sides thereof, and instead of providing the studs 2$^c$ and 3$^c$, a plurality of ribs and cooperating recesses may be provided in the cleats and clamping plate. The cleats and the channel bars or clamping plates may also be formed in sections instead of in one piece, and practically the same results be obtained.

It will thus be seen that in view of the simplicity of this device and the manner in which the parts are secured together, the belt may be quickly and easily placed around the transmission disks and the ends thereof secured together, and that the operation may be performed in a very limited space, as it is but necessary to tighten the nuts on the bolts to secure the parts together.

What I claim is:

1. In a belt splicer, the combination with a belt and a belt block associated therewith, of a pair of members at the meeting ends of the belt, means interlocking with said members for holding them in fixed position, and means for locking said parts together.

2. The combination with a belt and belt blocks adapted for use in connection with variable speed transmission mechanisms, of a pair of members fixed to the belt adjacent the severed ends thereof, means adapted to span said members for holding the severed ends of the belt together, and means for locking said fixed members and spanning member together.

3. In a belt splicer, the combination with a belt and a belt block associated therewith, of a pair of cleats adjacent the severed ends of said belt, means for fastening said cleats to said belt, a channel bar adapted to span said cleats when brought together, and means for locking said bar in position over said cleats.

4. In a belt splicer, the combination with a belt, and a belt block cooperating therewith, of members fixed to the severed ends of said belt, plates fixed to said belt between the belt and said block, a member adapted to extend over and hold said fixed members in juxtaposition to each other, and means for locking all of said parts in assembled relation.

5. In a belt splicer, the combination with a belt, and a belt block cooperating therewith, of a pair of cleats adjacent the severed ends of said belt, a pair of plates also adjacent said severed ends, means for fixing said cleats and plates to the belt, a channel bar adapted to engage and hold said cleats adjacent to each other, and bolts for locking all of said parts in fixed relation with each other.

6. In a belt splicer, the combination with a belt having abutting ends and a belt block associated therewith, of cleats affixed to said belt adjacent said abutting ends, a channel bar extending over the outer faces and outer side edges of said cleats and interlocking therewith, and means for locking all of said parts together.

In testimony whereof I hereunto affix my signature.

DARCY E. LEWELLEN.